Figure 1:
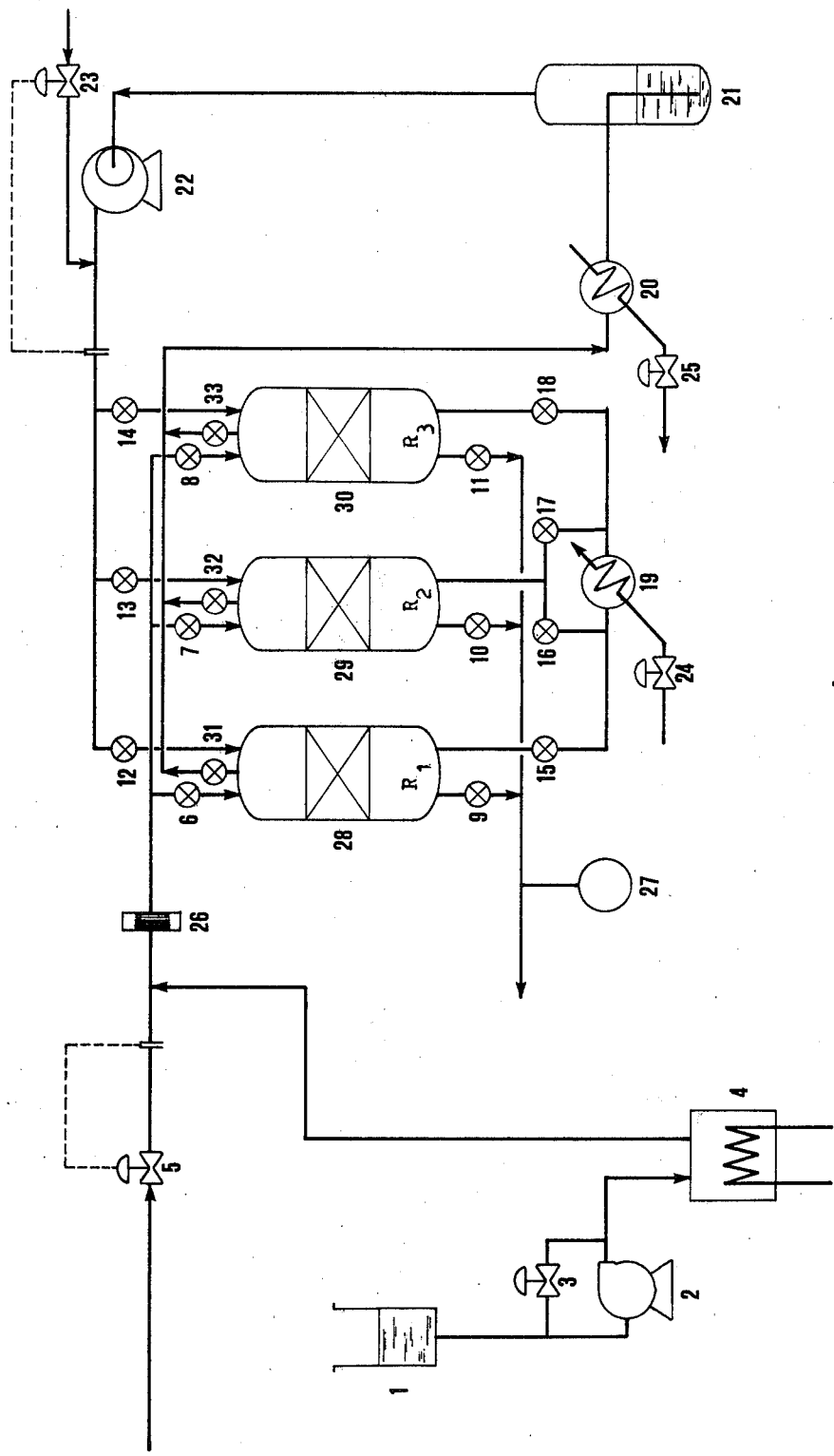

United States Patent [19]

Sacchetti et al.

[11] 4,421,532
[45] Dec. 20, 1983

[54] PROCESS FOR REMOVING AND RECOVERING VOLATILE ORGANIC SUBSTANCES FROM INDUSTRIAL WASTE GASES

[76] Inventors: Massimo Sacchetti, Via Azalee; Giovanni Aguzzi, P.zza Napoli, both of 11 Milano; Gianvittorio Bianchi, Frazione Alperolo, Albuzzano (Pavia); Giuseppe Caroprese, Via Matteotti, 40/70, Arese (Milano), all of Italy

[21] Appl. No.: 287,038

[22] Filed: Jul. 27, 1981

[30] Foreign Application Priority Data

Aug. 8, 1980 [IT] Italy ............................. 24105 A/80

[51] Int. Cl.³ .............................................. B01D 53/04
[52] U.S. Cl. .......................................... 55/28; 55/58; 55/59; 55/62; 55/74
[58] Field of Search ................. 55/26, 27, 28, 58, 59, 55/62, 74, 75, 179, 180, 208, 387, 389

[56] References Cited

U.S. PATENT DOCUMENTS

| | | | |
|---|---|---|---|
| 1,418,363 | 6/1922 | Coggeshall et al. | 55/59 X |
| 1,595,681 | 8/1926 | Oberfell | 55/62 |
| 1,595,683 | 8/1926 | Burrell et al. | 55/59 |
| 1,948,779 | 2/1934 | Abbott et al. | 55/62 X |
| 2,114,810 | 4/1938 | Ray | 55/62 X |
| 2,428,885 | 10/1947 | Luaces | 55/59 X |
| 2,818,133 | 12/1957 | Rosenthal | 55/59 |
| 3,243,938 | 4/1966 | Lavery et al. | 55/62 X |
| 3,527,024 | 9/1970 | McMinn et al. | 55/62 |
| 3,534,529 | 10/1970 | Mattia | 55/62 |
| 4,104,039 | 8/1978 | Kuri et al. | 55/58 X |
| 4,203,734 | 5/1980 | Winter et al. | 55/26 |
| 4,289,505 | 9/1981 | Hardison et al. | 55/59 |

FOREIGN PATENT DOCUMENTS 1069574 11/1959 Fed. Rep. of Germany .......... 55/59

*Primary Examiner*—Robert H. Spitzer
*Attorney, Agent, or Firm*—Stevens, Davis, Miller & Mosher

[57] ABSTRACT

A process for removing and recovering volatile organic substances from industrial waste gases by adsorption on to solid adsorbents and desorption by hot inert gas circulating in a closed cycle, carried out continuously or intermittently.

According to the new process, the volatile organic substances are recovered from the inert desorption gas partly by condensation by means of cooling, and partly by readsorption on to solid adsorbents.

7 Claims, 3 Drawing Figures

PROCESS FOR REMOVING AND RECOVERING VOLATILE ORGANIC SUBSTANCES FROM INDUSTRIAL WASTE GASES

This invention relates to a new process for recovering volatile organic substances from industrial waste gases. Hereinafter, reference will be made for simplicity only to air as the waste gas, and to volatile organic substances in the form of organic solvents, entrained by the waste gas.

Organic solvents are used in most production and treatment processes in the chemical industry. Although efficient recovery systems can be used, a large proportion of these solvents is dispersed into the atmosphere, creating, pollution problems which have become particularly felt in recent years, in that much more severe antipollution laws have strongly reduced the toleration limits for organic substances in effluent fluids.

At the same time, solvent prices have increased greatly in the chemical industry, to the extent of making their recovery profitable, whereas the increase in the heating and cooling costs of the air discharged from a plant has made its reuse convenient. Before being recycled, this air must naturally be purified to a very low organic solvent content.

The existence of the aforesaid industrial problems has led to the creation of a certain number of processes for recovering solvents from waste gases or from the discharge air of chemical plants. The most efficient processes used up to the present time are based essentially on the use of absorption vessels filled with activated carbon or other adsorbents such as silica gel, alumina or molecular sieves, through which the discharge air is passed before being dispersed into the atmosphere.

These vessels are suitably sized, according to the solvent to be adsorbed, on the basis of experimental adsorption curves, on the basis of the air throughput, the solvent concentration thereof and the length of the working cycle, in such a manner as to reduce the residual solvent content of the air to the required value, and in general as close to zero as possible.

The adsorbent (and reference will be made hereinafter for simplicity only to activated carbon, which is the most widely used adsorbent) saturated with solvent is regenerated by stripping with steam or with hot gases such as nitrogen or burnt gases. The solvents are then recovered from the steam by condensation and decantation or distillation in suitable apparatus, or are recovered from nitrogen or burnt gases by cooling these latter to a temperature of between $-50°$ and $-100°$ C. in order to condense the entrained solvents, the gas then being recycled in a sufficiently pure state.

A new process has now been discovered, and forms the subject matter of the present invention, for removing and recovering organic solvents from the discharge air from chemical plants, this process being able to be applied to any type of plant and to any type of solvent without any limitation, with extremely more economical yields than the processes carried out up to the present time. In particular, the new process can be applied to discharge air containing very low proportions of solvents, even much less than 200 g/Nm$^3$.

The advantages of the new process over individual known processes will be more apparent from the detailed description given hereinafter of the new process and the apparatus for carrying it out.

The new process according to the present invention consists essentially of recovering the organic solvents present in the discharge air from chemical plants by adsorption on to activated carbon and desorption with hot nitrogen, and recovering the solvents from the nitrogen partly by adsorption on to activated carbon and partly by condensation by means of cooling the gas stream.

In practice, the application of the basic principle of the present invention, i.e. the recovery of the solvent in the nitrogen circulating in a closed cycle, only partly by condensation by means of cooling, the remainder being recovered by readsorption on to activated carbon, leads to an extensive modification of the entire purification and recovery cycle and of the operating conditions, because of which results are obtained which are substantially different than those of the known processes, and considerably advantageous with respect thereto.

The process according to the present invention comprises essentially the following stages:

1. Adsorbing the solvent contained in the contaminated air on to activated carbon during the purification stage;
2. Adsorbing the solvent contained in the cold nitrogen on to activated carbon during the regeneration stage;
3. Heating the practically pure nitrogen to the necessary temperature for regeneration, this depending on the solvent to be recovered;
4. Stripping the solvent contained in the saturated or nearly saturated activated carbon by means of hot nitrogen, and then regenerating the carbon;
5. Cooling the nitrogen to a temperature below ambient temperature, which depends on the type of solvent to be recovered, and then recovering part of the solvent contained therein by condensation;
6. Recycling to stage (2) the cold nitrogen containing the solvent quantity corresponding to thermal equilibrium.

The process according to the invention is described hereinafter for greater clarity with reference to a specific case carried out in an experimental plant and illustrated in FIG. 1, in which the reference numeral 1 indicates a solvent vapour feed tank (the solvent in this case being ethyl acetate) which by means of a metering pump 2 and control valve 3 feeds a vaporiser 4 which is connected to the air feed pipe, the air flow rate being controlled by the pneumatic valve 5.

Before entering the adsorption section, the air stream containing the solvent vapour is filtered in the filter 26 in order to remove any suspended solid particles.

The air contaminated with the solvent is fed to the adsorbers $R_1$, $R_2$, $R_3$ by cyclic operation of the servo-controlled valves 6, 7, 8, and the purified air is discharged to the atmosphere by operating the valves 9, 10, 11.

The purity of the discharged air is determined continuously by means of a suitable analyser 27. The adsorbers $R_1$, $R_2$, $R_3$ are in the form of vessels with dished ends, and contain the adsorbent 28, 29, 30 which rests on perforated plates, the purpose of which is to allow the air and regeneration gas to flow, while at the same time supporting the adsorbent in the form of a porous, compact bed.

The adsorbent can be a permeable solid, but is normally a compact bed of material in the form of granules, filaments or cylinders.

The material preferably used is granular activated carbon, but other adsorbents can be used such as silica gel or molecular sieves (zeolites), according to the solvent to be removed and recovered.

In this specific case, as the solvent is ethyl acetate, the vessels $R_1$, $R_2$ and $R_3$ are filled with activated carbon in the form of granules. The solvent desorption and recovery, and thus the stripping and regeneration of the adsorbers, is carried out by means of an inert gas such as $N_2$, $CO_2$, or burnt gases free from $O_2$. In this specific case, nitrogen was used, and this is also the preferred gas for carrying out the process according to the present invention. It will be assumed that at the moment under consideration the bed $R_2$ is in the adsorption stage and is thus traversed from the top to the bottom by the stream of solvent-contaminated air, which leaves practically pure, whereas the beds $R_1$ and $R_3$ are in the regeneration stage. The process according to the invention can be applied to air streams containing any quantity of solvent, but is particularly useful for treating discharge air containing small quantities of solvent below 200 g/Nm$^3$, and generally not exceeding 10–15 g/Nm$^3$.

In the case considered, the experiment was carried out with an ethyl acetate content of 4 g/Nm$^3$ in the air entering the bed $R_2$, while the air leaving contained 0.23 g/Nm$^3$ of ethyl acetate, i.e. a quantity well within the limits of tolerance, with an air purification efficiency exceeding 90%.

The adsorbent beds $R_1$, $R_2$, $R_3$ are calculated on the basis of the experimental curves (see FIG. 2) for the adsorption of ethyl acetate on activated carbon having the characteristics given in the table, and are dimensioned such as to still have a considerable residual adsorption capacity after passage of the contaminated air, in order to allow the further adsorption of solvent from the nitrogen during the regeneration cycle, as described hereinafter.

TABLE 1

| Characteristics of the activated carbon used | |
|---|---|
| Extruded granular carbon activated by steam | |
| Bulk density | 500 g/liter |
| Granule diameter | 3 mm |
| Humidity | 2% by weight |
| Ash content | 4% by weight |
| Pore distribution | |
| Micropores (< 1 mm) | 0.26 cm$^3$/g |
| Transition pores (1–100 mm) | 0.06 cm$^3$/g |
| Macropores (> 100 mm) | 0.35 cm$^3$/g |
| Specific surface area (B.E.T. test) | 700 m$^2$/g |

The cold regeneration nitrogen which leaves the condensed solvent collection vessel 21 at a temperature of $-20°$ C. and having a solvent content of about 34 g per Nm$^3$ (corresponding to the thermodynamic equilibrium concentration) is fed to the bed $R_1$ at the point 31 through the valve 12, this bed being partly loaded with solvent by virtue of having adsorbed it from the contaminated air when it was in the adsorption stage.

Figure 2:
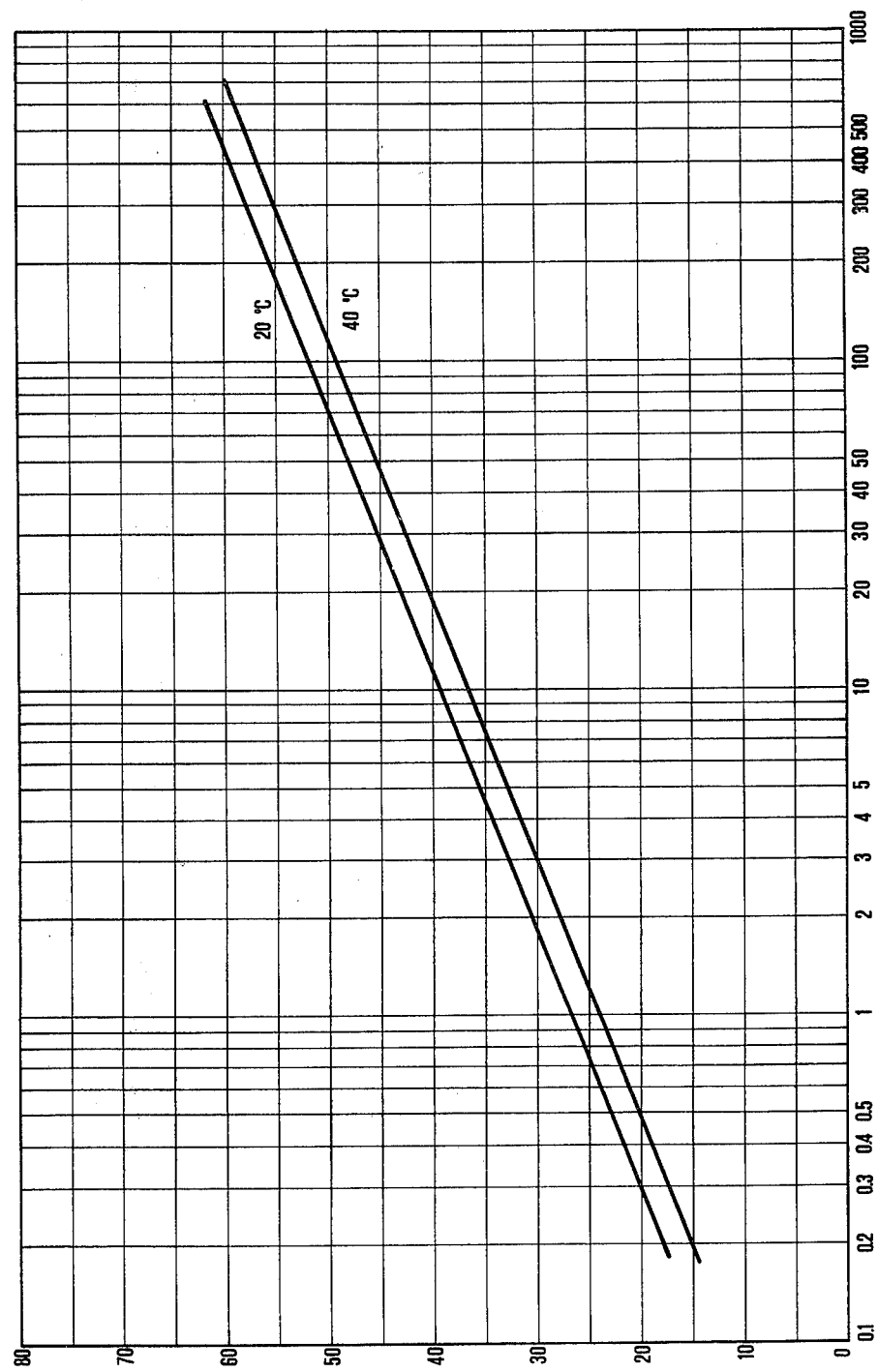

As already stated, the adsorbing bed is calculated on the basis of the experimental curves of FIG. 2, such that it is able also to adsorb in practice all the solvent contained in the cold nitrogen. In practice, the concentration is reduced to 0.1 g/Nm$^3$. The nitrogen leaving the base of the bed $R_1$ is fed through the valve 15 to the heater 19, where its temperature is raised to about 200° C. The gas at 200° C. enters the bed $R_3$ at its base, and desorbs practically quantitatively the solvent adsorbed in the previous cycle.

As an alternative to the heater 19, in order to raise the temperature of the gas and adsorbent to be regenerated to the required value, it is possible to provide heat sources such as simple or finned electrical heating elements, tubes traversed by hot fluids and the like, immersed in the adsorbent in the bed $R_3$. It is also possible to apply vacuum to the bed during the desorption stage in order to facilitate desorption. In practice, the $N_2$ leaving the bed $R_3$ contains about 80 g/Nm$^3$ of ethyl acetate, which is entrained in the cooler 20 where the temperature is lowered to $-20°$ C. Part of the solvent (46 g/Nm$^3$) is condensed, whereas the remaining part (34 g/Nm$^3$) remains in the inert cold gas which is fed to a new regeneration cycle and is adsorbed practically completely in the bed during the adsorption stage as heretofore described.

Summarising, the air is thus purified to the required limits and the solvent is practically completely recovered, partly by adsorption and desorption in two successive cycles and partly by condensation. If the same quantity of solvent, 80 g/Nm$^3$, were to be recovered completely by condensation in a single cycle, an extremely low temperature would be necessary in the condenser.

In this respect, to reduce the concentration of ethyl acetate by 80 g/Nm$^3$, the temperature must be lowered to at least $-50°$ C. Even then, the quantity present would still be too high to carry out an effective desorption.

In order to evaluate the efficiency of the process according to the present invention, the results obtained in a series of experiments carried out on an experimental plant corresponding to that shown in FIG. 1 are given.

The adsorbers were constituted by vessels with a cylindrical shell of diameter 0.8 m, and a layer of activated carbon having a thickness of 500 mm.

Each adsorber contained 125 kg of activated carbon.

Tests were carried out varying the adsorption cycles from ½ hour to 24 hours.

The ethyl acetate feed and recovery vessels had a useful volume of 200 liters to allow operation of at least 24 hours.

In all the tests, the results summarised in the following table were constantly obtained, this table showing the essential data regarding the composition of the air contaminated with ethyl acetate at the inlet and purified air at the outlet, these data enabling the efficiency of the purification plant in which the process of the present invention is carried out to be evaluated.

TABLE 2

| | | Inlet | Outlet |
|---|---|---|---|
| Temperature | °C. | 40 | 40 |
| Velocity | m/sec. | 12.5 | 12.5 |
| Diameter of discharge pipes | mm | | 100 |
| Air throughput | Nm$^3$/h | 300 | 300 |
| Air analysis | | | |
| nitrogen | Nm$^3$/h | 237 | 237 |
| oxygen | Nm$^3$/h | 63 | 63 |
| ethyl acetate | kg/h | 1.2 | 0.07 |
| Efficiency % = [(1.2−0.07)/1.2] × 100 = 94.2 | | | |

It is apparent that a plant for carrying out the process according to the present invention can comprise any number of adsorbers according to the air throughput to be purified, this being divided into equal volumes over all adsorbers during the adsorption stage.

The plant is suitably dimensioned taking account of the level of contamination of the gas stream to be treated, the residual percentage of solvent which can be tolerated in the gas stream which is discharged into the air, and the plant efficiency.

The process for purifying gaseous streams and recovering solvents contained therein has been described up to this point in terms of a continuously operating plant in order to match the continuous operation of the primary process upstream of the adsorption stage.

In reality, this embodiment of the invention is that preferred from the point of view of maximum process economics.

The new process can however also be used downstream of an intermittently operating plant, and can thus itself operate intermittently, with excellent efficiency and good economics.

Figure 3:
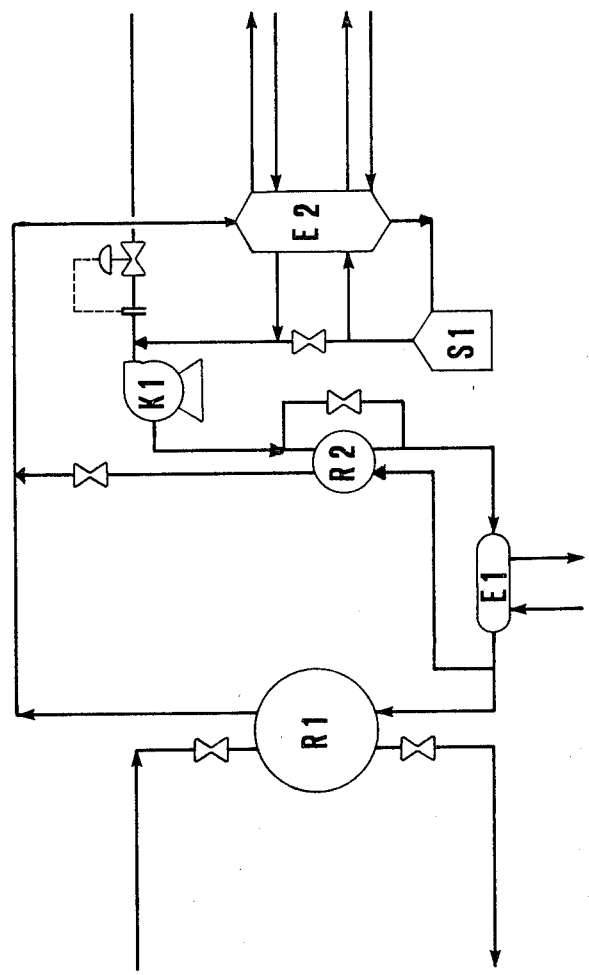

This aspect of the invention will be more apparent with reference to the accompanying FIG. 3.

In FIG. 3, the activated carbon adsorber $R_1$ is assumed to be dimensioned such as to ensure outflow of air free from ethyl acetate for the entire duration of a working cycle of 8 hours or 16 hours. At the end of the cycle, the adsorbent bed must be regenerated so that it is ready for the new adsorption cycle. For an adsorption cycle of 8 hours, regeneration is kept to the shortest possible time (for example 1 hour). Regeneration of $R_1$ and thus solvent recovery are started by commencing circulation of the desorption nitrogen through the adsorbent bed $R_2$ and heater $E_1$ by means of the blower $K_1$. The purpose of the adsorber $R_2$ (of small dimensions) is to adsorb the solvent stripped by the nitrogen from the bed $R_1$ which has not been condensed in $E_2$, so ensuring that the nitrogen returns to $R_1$ practically free from solvent (not more than 0.1 g/Nm$^3$), and also ensuring that a temperature of $-20°$ C. is sufficient in the condenser $E_2$ for condensing the remaining proportion of pure ethyl acetate, which is collected in $S_1$.

In practice the pure nitrogen at 200° C. from the heater $E_1$ enters the bottom of the adsorber $R_1$, and leaves containing 80 g/Nm$^3$ of solvent, to pass through the heat exchanger $E_2$ kept at $-20°$ C., in which 46 g/nm$^3$ of solvent are condensed and collected in $S_1$. It is then blown by the blower $K_1$ into the adsorber $R_2$, which is sized so as to adsorb the remaining 34 g/Nm$^3$ over the entire regeneration cycle, which is contained within the required time.

At intervals, the regeneration of $R_2$ is carried out using the same nitrogen circuit as described, and using the suitable bypass valves provided.

From the description given heretofore it is apparent that the characteristic point of the process according to the present invention, and which governs the entire process, lies in the adsorption of a percentage of the solvent contained in the cold inert regeneration gas, in an activated carbon adsorber, preferably in one or more of the actual adsorbers used in the primary air purification cycle, these being connected alternately into the adsorption cycle, and into the regeneration cycle.

Such a stage essentially enables:

1. the solvent content of the inert gas fed for regenerating the adsorption beds to be reduced to minimum concentrations, and thus the contaminating solvent to be practically completely recovered without using very low temperatures;

2. the concentration of the solvent to be regenerated contained in the activated carbon to be increased in a simple manner, so as to make its desorption much easier and more complete.

The new process according to the present invention has the following advantages over known purification and recovery processes:

a. Processes which use steam as the regenerating fluid are limited to the recovery of low boiling solvents, whereas the new process can be used for any solvent without limitation.

In addition, the use of steam with solvents which form corrosive substances in an aqueous environment necessarily requires very costly special stainless steel equipment to be used. The new adsorption-desorption process can be carried out in equipment constructed of normal carbon steel.

Other considerable increased cost arise in the case of steam when using solvents miscible with water, in that it is necessary to provide distillation equipment for separating the solvent from the water. In these cases the new process, in which the problem does not arise, is much more economical and convenient.

b. With respect to known processes in which nitrogen is used (or any other equivalent gas), the new process has the advantage of comprising a closed nitrogen cycle in which the nitrogen always has a very low solvent content, so as to be able to consider it pure for practical purposes.

The very low solvent content of the regeneration nitrogen allows high desorption efficiency with a consequent greater plant operating economy.

However, by far the most important advantage of the new process is the fact that as the solvent is recovered only partly by cooling, it is sufficient to reduce the gas loaded with solvent to a temperature which is not as low as the temperature necessary in the case of known inert gas processes.

This obviously gives rise to considerable energy and cost saving. In addition, at a temperature of around $-50°$ C. (normally attained in known processes), the moisture in the air also freezes to create mechanical complications in equipment operating at low temperature, these complications not existing with the new process.

In all cases, the capital cost of a purification and recovery plant according to the process of the present invention is less than that of known steam or inert gas plants, because of which the solvent recovery effected thereby enables the plant to be written off in a considerably shorter time than in the case of the known art.

We claim:

1. A process for removing and recovering a volatile organic substance from an industrial waste gas comprising
    (1) passing an industrial waste gas containing a volatile organic substance over a solid adsorbent for said volatile organic substance to adsorb said volatile organic substance therein,
    (2) desorbing the sorbed solid adsorbent with a hot steam-free inert desorption gas circulating in a closed cycle, the desorbing operation comprising the steps of:
        (a) heating a steam-free inert desorption gas,
        (b) circulating the heated steam-free inert desorption gas through the sorbed solid adsorbent to be regenerated, (c) cooling the circulated desorption gas now enriched with said volatile organic substance at a temperature suitable for condensation of most of said organic substance to form a condensate,
(d) separating said condensate from the remaining circulated desorption gas,
(e) purifying the desorption gas by passing said gas through the same adsorbent through which said industrial waste gas has passed in the adsorption step (1), said adsorbent being regenerated with the same desorption gas circulating in a closed cycle, and
(f) recycling the purified desorption gas to heating step (a), and
(3) recovering a portion of said volatile organic substance by cooling said hot steam-free inert desorption gas containing said volatile organic substance and recovering the remainder of said volatile organic substance by readsorbing said volatile organic substance in said inert gas on said solid adsorbent.

2. A process according to claim 1, wherein the desorption is facilitated by applying vacuum.

3. A process according to claim 1, wherein the solid adsorbent is granular activated carbon, and the inert gas is nitrogen.

4. A process according to claim 1, wherein the desorption is carried out with inert gases before feeding volatile organic substances to the solid adsorbent.

5. A process according to claim 1, wherein the desorption is carried out with inert gas heated by means of heat sources immersed in the solid adsorbent loaded with volatile organic substances.

6. The process of claim 1, wherein purification of the desorption gas is carried out by passing said gas through at least one adsorbent provided at the outlet of the condensation/separation system, said at least one adsorbent being regenerated with the same desorption gas circulating in a closed cycle.

7. The process of claim 1, further comprising cooling the regenerated solid adsorbent with purified desorption gas before said gas is heated.

* * * * *